Figure 6:
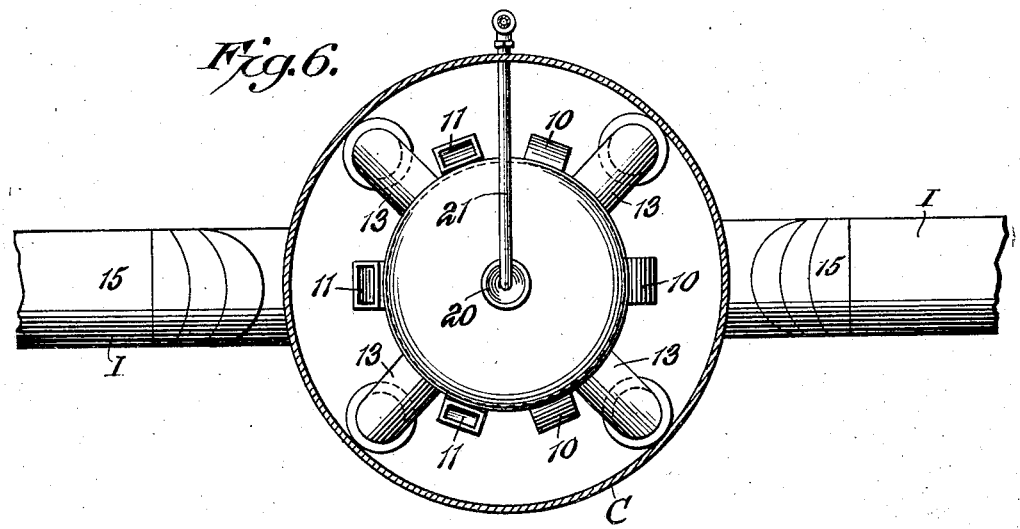

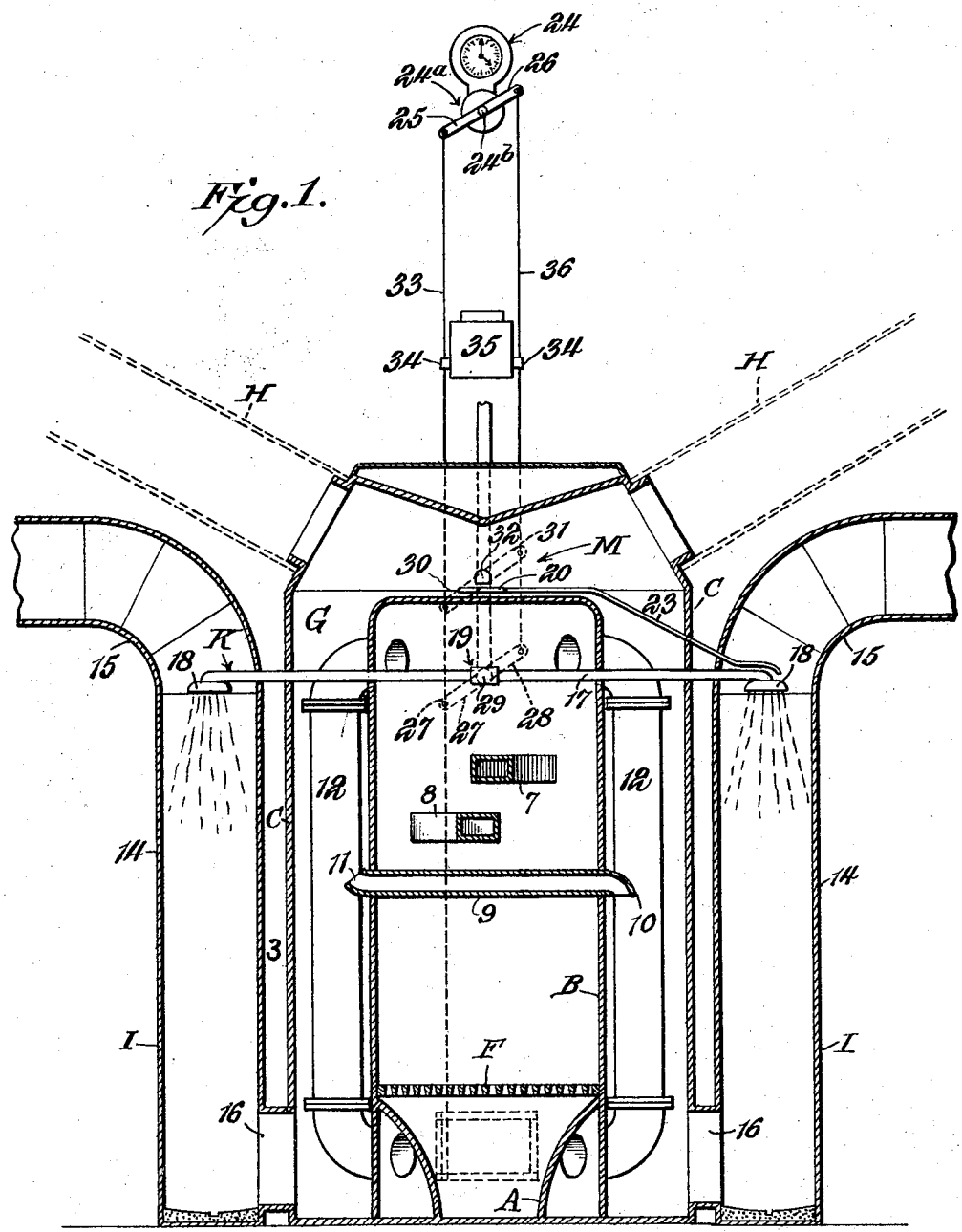

Jan. 14, 1930.  W. V. LINDSAY  1,743,362
HOT AIR FURNACE
Filed Dec. 21, 1928  3 Sheets-Sheet 2
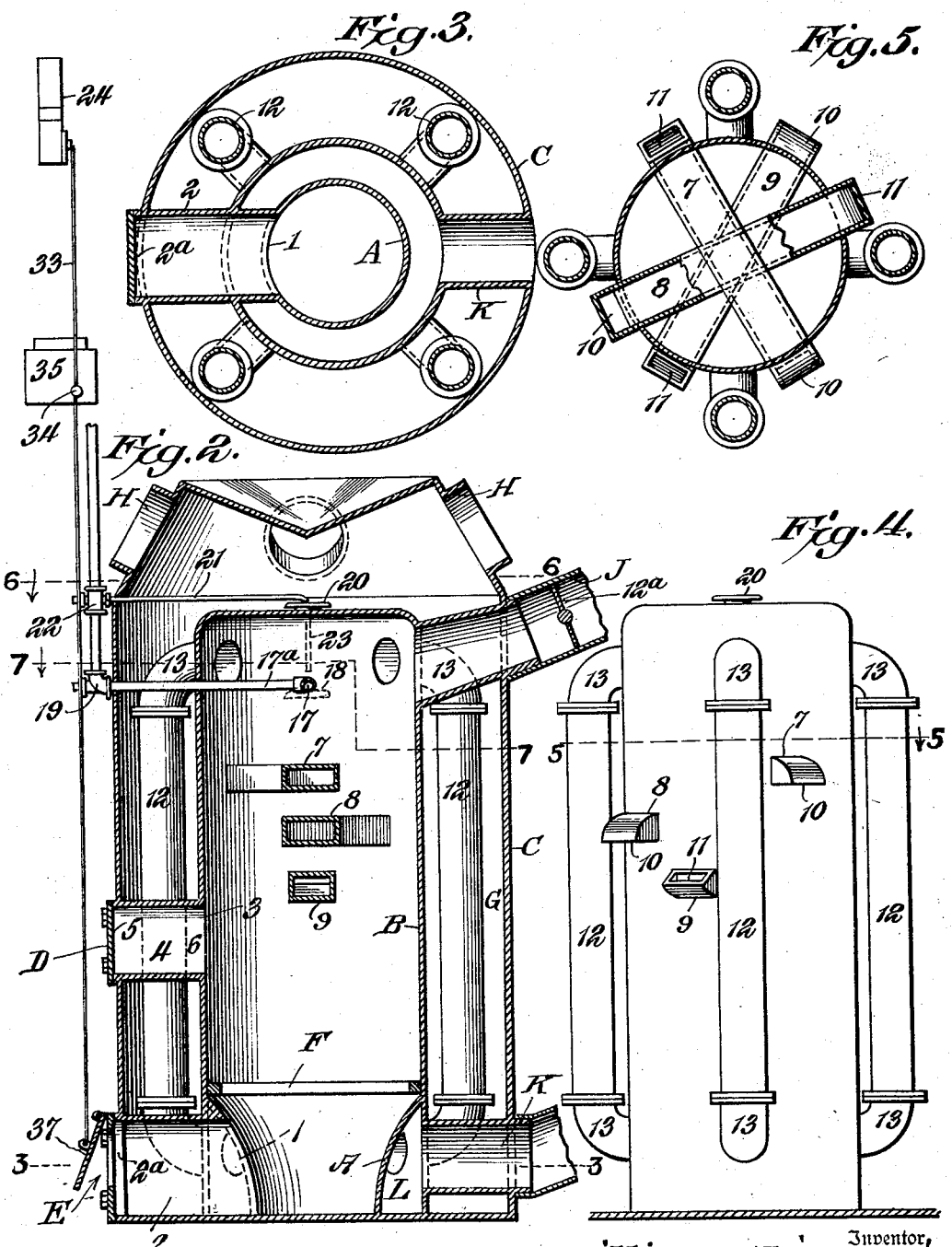
Inventor,
William V. Lindsay,
By Baldwin & Hight
Attorneys.

Inventor,
William V. Lindsay,
By Baldwin & Stight
Attorneys.

Patented Jan. 14, 1930

1,743,362

UNITED STATES PATENT OFFICE

WILLIAM V. LINDSAY, OF WINONA, MINNESOTA

HOT-AIR FURNACE

Application filed December 21, 1928. Serial No. 327,653.

My invention relates to hot air furnaces and more particularly to improvements in a hot air furnace of the down draft type in which the air to be heated in the furnace is caused to contact with a maximum surface of the ducts or passages through which the products of combustion pass; and also to improvements in the means controlling the admission and conditioning of air to the various heating chambers and passages in the furnace, and to improvements in the means employed for controlling the circulation of air to be heated.

Certain features of the invention constitute improvements upon the furnace structure shown and described in Letters Patent No. 1,604,833 issued to me October 26, 1926. Among other features described in that patent is the provision and arrangement of a number of superheating pipe sections disposed within the inner furnace shell and above the fire therein, and through which a portion of the air being heated is conducted for the purpose of raising the temperature thereof a maximum number of degrees for a given difference between the temperature of the incoming air and that of the products of combustion.

One feature of the present invention is the provision of superheating pipe sections which differ in shape and arrangement from those described in the above-mentioned patent. By means of this new arrangement I am enabled to prevent the formation of eddy currents in the furnace gases passing over the superheater sections and to thereby obtain greater heating efficiency.

Another feature of the present invention is the means associated with the air intake pipes for cooling the air immediately prior to the same entering the furnace, thus causing the air to contract, whereby the rate of flow of the incoming air is increased and the circulation of air through the heating chambers and ducts of the furnace is improved.

My invention also provides new and improved means for maintaining the relative humidity of the air leaving the furnace at a predetermined value.

Separate means are provided for controlling the relative humidity of the air, the cooling of the incoming air, and the rate of flow of air through the furnace grate, and these controlling means are preferably all actuated in unison by a thermostat located in a room into which heated air is discharged from the furnace.

Figure 7:
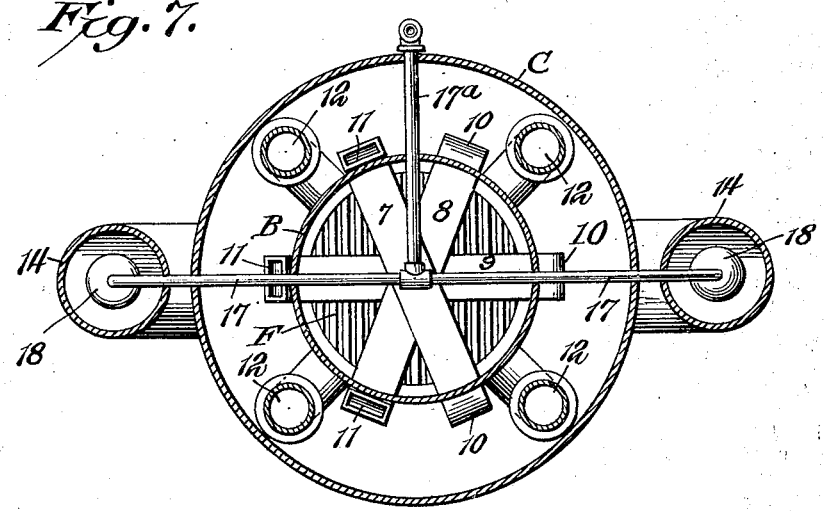

With these and other objects in view, the invention will be understood from a reading of the following description, the appended claims, and the several views illustrated in the drawings in which:

Figure 1 is a central vertical sectional view of a furnace embodying my invention, Figure 2 is a central vertical sectional view thereof taken at right angles to Figure 1, Figure 3 is a horizontal sectional view taken on the line 3—3 of Figure 2, Figure 4 is a side elevation of the inner shell of the furnace and appurtenances, the outer shell being removed, Figure 5 is a sectional view taken on the line 5—5 of Figure 4, Figure 6 is a sectional view taken on the line 6—6 of Figure 2, and Figure 7 is a sectional view taken on the line 7—7 of Figure 2.

Like numerals designate corresponding parts throughout the several views illustrated.

In the drawings there is shown a hot air furnace embodying my invention and including an ash box A, an inner furnace shell B fitting around the ash box and extending upwardly therefrom, an outer furnace shell C having a fire door D and an ash door E, and grates F. The inner shell B is arranged concentrically within the outer shell C and has its top and bottom walls spaced from the top and bottom walls of the shell C to form a resultant air heating chamber G. Connected to the outer shell C and arranged to communicate with the air heating chamber G are hot air outlet pipes H located at the top of the furnace and cold air inlet pipes I communicating with the chamber G at the lower end thereof, such pipes I serving as return pipes for the air from the rooms or area heated by the furnace.

There are also provided an upper smoke pipe J extending through the chamber G and communicating with the interior of the inner shell B at its upper end, and a lower smoke pipe K passing through the chamber G and communicating with a lower gas chamber L, between the inner shell C and the ash box A.

The ash box A is provided with an opening 1, and extending outwardly from this opening through the chamber G is a tube 2. The outer shell is provided with an opening $2^a$ which registers with said tube and the opening 1, and the ash door E is so mounted as to cover this opening when in closed position.

The inner shell B is provided with an opening 3 which registers with a tube 4 passing through the chamber G and registering with an opening 5 in the outer shell. The fire door D is so mounted as to cover the opening 5 when closed.

The inner shell is provided with three superheater pipe sections 7, 8 and 9, respectively, arranged one above the other and each disposed along a diameter of the inner shell. In order that the products of combustion will contact with as large an area of said sections as possible, the sections are respectively disposed in different radial planes. These sections have their opposite end portions projecting from the inner shell into the air heating chamber G. Each section has its top wall curved downwardly at one end to form a downwardly facing air entrance opening 10 and has its bottom wall curved upwardly at the opposite end to form an upwardly facing air exit opening 11, both openings communicating with the chamber G. It will be apparent that part of the air entering the chamber G from the air inlet pipes I and thence passing up through chamber G will enter the downwardly facing inlet openings 10 of the superheater pipes and will then pass through the pipes, being thereby considerably further heated by the hot gases passing around the pipes and will then be discharged from the upwardly facing exit openings 11, into the chamber G, subsequently passing out through the hot air outlet pipes H.

In order to still better utilize as much of the heat contained in the products of combustion as possible, I provide a plurality of vertically disposed pipes 12—12 located within the chamber G and communicating at their upper ends with the interior of the inner shell B by means of elbows 13 and at their lower ends with the chamber L by means of similar elbows. The smoke pipes J and K are connected together at a point (not shown) and from this point of connection communicate with the stack by means of a single smoke pipe (not shown). The smoke pipe J is provided with a butterfly damper $12^a$ and it will be apparent that by closing the damper the products of combustion will arise through the inner shell and will then pass into pipes 12, thence downwardly through said pipes into the chamber L, and will then pass out through the lower smoke pipe K. In this way the pipes 12 are heated and become available for heating the incoming air as it passes up through the chamber G.

Each cold air inlet pipe I includes a vertical portion 14 adjacent the furnace and extending downwardly from an elbow 15 to communicate at its lower end with the chamber G by means of a short horizontal passage 16. In order to control the flow of air through the intake pipes so as to be able to increase this flow above that otherwise due to natural convection of air currents, I provide in these pipes I, means for cooling the air in the vertical portions 14 and thus contracting said air. This contraction results in a reduction in pressure at this point so that the air in the upper portion of the intake pipes, that is above the elbows 15, descends to occupy the space left by the contraction of the air in the portions 14 and causes an increased rate of down draft in the air intake pipes. For accomplishing this contraction of the air, I provide cooling means K comprising a horizontal water pipe line 17 extending across the furnace exteriorly thereof and having rearwardly extending pipe sections $17^a$ which project into the respective air intake pipes I and are provided at their inner ends with sprinklers 18—18. For controlling the flow of water through the pipe and out of the sprinklers there is provided a needle valve 19 interposed in the pipe line 17. It will be seen that by opening and closing the needle valve a greater or lesser amount of water will be sprayed from the sprinklers into the air intake pipes, thereby effecting a greater or lesser degree of contraction of the air therein. The lower end of the vertical portion 14 of each intake pipe is disposed slightly below the bottom wall of the horizontal air passage 16 so that water sprayed from the sprinklers 18 may be drained from the bottom of the vertical portions 14 by any suitable means.

In carrying out my invention, I also provide means for regulating the relative humidity of the hot air delivered by the furnace. This humidifying means, generally indicated M, includes an evaporating dish 20 located within the upper portion of the chamber G and fixed to the top wall of the inner shell B, a water pipe line 21 arranged to discharge into the dish and a needle valve 22 interposed in the pipe line 21 for controlling the flow of water therethrough. The needle valve is so arranged as to permit a very slow flow of water through the pipe line 21 so that, instead of a stream of water emerging from the pipe and into the dish, there is only a slow drip. When the furnace is hot the water which drips into the dish will be evaporated practically instantaneously so that water will not collect within the dish. By controlling the rate of dripping of water into the evaporating dish, I am able to obtain a very close degree of regulation of the relative humidity of the air leaving the furnace.

In order that water will not collect in the evaporating dish, I provide a drain pipe 23 communicating at one of its ends with the dish and at its other end with one of the air intake pipes I at a level lower than the dish. If, by chance, the furnace fire goes out and the furnace cools down, the water, instead of collecting in the dish due to the absence of heat for evaporating said water, will drain off through the pipe 23 and then drop into the lower end of the intake pipe 14, from whence it is drained off.

For automatically controlling the flow of water into the intake pipe 14 from the sprinklers 18, and for controlling the rate of dripping into the evaporating dish, I provide a thermostat 24, preferably located in a room to be heated by the furnace and connected to the valves 19 and 22 for operating both valves in unison. Any conventional type of thermostat may be used, and I have shown the thermostat as including an arm 24$^a$ pivoted to a shaft 24$^b$ of a thermostat motor at the central point of the arm to provide oppositely disposed cranks 25 and 26. The needle valve 19 is provided with oppositely disposed crank arms 27 and 28 fixed to the valve stem 29 and the valve 22 is in a similar manner provided with oppositely disposed crank arms 30 and 31 fixed to the valve stem 32. The crank arm 25 of the thermostat is connected to the arm 30 of the valve 22 and also to the arm 27 of the valve 19, by a chain or other connection 33 passing through a guide 34 fixed to a beam 35 above the furnace. In like manner, the arm 26 of the thermostat is connected to the arm 31 of the valve 22 and also to the arm 28 of the valve 19 by means of a chain or other connection 36 passing through a guide 34.

It will be seen that if the shaft of the thermostat is rotated in a clockwise direction the stems of the valves 19 and 22 will be rotated in a clockwise direction and will thereby effect a change in the flow of water through both of these valves at the same time. When the shaft of the thermostat rotates in a counter-clockwise direction the valve stems will be returned to their original positions.

The furnace is provided with the usual draft door 37 hinged at its upper end to the ash door E to swing upwardly about a horizontal axis. The chain 33 is extended from the valve arm 27 down to the draft door 37 so that, upon clockwise rotation of the arm 25 of the thermostat, the door will be raised to increase the furnace draft while a counter-clockwise rotation of the arm will close the door 37 and thus decrease the draft.

From the foregoing it will be apparent that in my improved furnace I have provided an improved arrangement of superheater pipe sections extending transversely through the inner shell of the furnace; and that I have also provided means associated with the cold air inlet pipes for effecting the contracting of air therein to increase the circulation of air to be heated, and also means for maintaining the relative humidity of the heated air at a predetermined value. By so connecting the thermostat to the valve for controlling the flow of water into the evaporating dish and also to the valve controlling the spray of water into the air intake pipes and to the draft door, I am able to vary the draft of the incoming cold air and the degree of humidity of the outgoing hot air in accordance with the temperature of the fire as governed by the opening or closing of the draft door and to thereby so regulate the different factors entering into the proper heating and conditioning of the air as to obtain the most efficient results from the furnace.

I claim as my invention:

1. In a hot air furnace including an air heating chamber and a hot air outlet pipe communicating with said chamber; the combination with an air return pipe communicating with the chamber; of means for spraying water into the return pipe for effecting the contraction of the air therein to govern the temperature of the air within the furnace; and temperature responsive means for disposition in a room heated by the furnace for controlling the water spraying means.

2. In a hot air furnace including an air heating chamber and a hot air outlet pipe communicating with said chamber; the combination with an air return pipe communicating with the chamber; of means for spraying water into the return pipe for effecting the contraction of the air therein to govern the temperature of the air within the furnace; a water pipe line for supplying water to said spraying means, a valve in said pipe line, a thermostat disposable in a zone heated by the furnace for controlling said valve, and operative connections between said thermostat and said valve.

3. In a hot air furnace including an air heating chamber and a hot air outlet pipe communicating with said chamber; the combination with an air return pipe having a vertically disposed portion adjacent the furnace and communicating with the chamber; of means for spraying water into the return pipe at the upper end of said vertical portion for effecting the contraction of the air therein to govern the temperature of the air within the furnace, a water pipe line for supplying water to said spraying means, a valve in said pipe line, a thermostat disposable in a room heated by the furnace for controlling said valve, and operative connections between said thermostat and said valve.

4. In a hot air furnace, the combination with an outer shell having a top and side walls; of an inner shell disposed therein and having top and side walls spaced from the top and side walls of the outer shell respectively to form an air heating chamber, an air return passage communicating with said chamber to admit air to govern the temperature of air within the furnace, a hot air outlet passage communicating with said chamber, an evaporating dish within said chamber and supported by the top wall of the inner shell, a pipe line for supplying water to said dish, a valve in said pipe line, and temperature responsive means disposable in a room heated by the furnace and connected to the valve for controlling the flow of water in said pipe line.

5. In a hot air furnace, the combination with an outer shell having a top and side walls; of an inner shell disposed therein and having top and side walls spaced from the top and side walls of the outer shell respectively to form an air heating chamber, an air return passage communicating with said chamber; a hot air outlet passage communicating with said chamber, an evaporating dish within said chamber and supported by the top wall of the inner shell, means for supplying water to said dish at a regulated rate, and a drain pipe connected at one end to the dish and communicating at its other end with said air return passage at a level lower than said dish.

6. In a hot air furnace, the combination with an outer shell having a top and side walls; of an inner shell disposed therein and having top and side walls spaced from the top and side walls of the outer shell respectively to form an air heating chamber, an air return passage communicating with said chamber, and having a vertical portion adjacent said outer shell, a hot air outlet passage communicating with said chamber, an evaporating dish within said chamber and supported by the top wall of the inner shell, a pipe line for supplying water to said dish, a valve in said pipe line, means for spraying water into said cold air inlet passage at a point adjacent the upper end of said vertical portion for effecting the contraction of the air therein to govern the temperature of the air within the furnace; a pipe line for supplying water to said spraying means, a valve in said pipe line, and a thermostat disposable in a room heated by the furnace and connected to both of said valves for operating the valves in unison whereby the rate of flow of water into said evaporating dish, and the rate of flow of water to said spraying means will be simultaneously varied.

7. In a hot air furnace, the combination with an outer shell having a top and side walls; of an inner shell disposed therein and having top and side walls spaced from the top and side walls of the outer shell respectively to form an air heating chamber, a door controlling the admission of air to said inner shell, an air return passage communicating with said chamber, and having a vertical portion adjacent said outer shell, a hot air outlet passage communicating with said chamber, an evaporating dish within said chamber and supported by the top wall of the inner shell, a pipe line for supplying water to said dish, a valve in said pipe line, means for spraying water into said air return passage at a point adjacent the upper end of said vertical portion for effecting the contraction of the air therein to govern the temperature of the air within the furnace; a pipe line for supplying water to said spraying means, a valve in said pipe line, and a thermostat disposable in a room heated by the furnace and connected to both of said valves and to said door for operating the valves and the door in unison whereby the rate of flow of water into said evaporating dish, and the rate of flow of water to said spraying means, and the rate of flow of air into said inner shell will be simultaneously varied.

In testimony whereof, I have hereunto subscribed my name.

WILLIAM V. LINDSAY.